United States Patent [19]

Kashiyama

[11] Patent Number: 5,140,231
[45] Date of Patent: Aug. 18, 1992

[54] DRIVE CIRCUIT FOR VIBRATORY-WAVE MOTOR

[75] Inventor: Ritsuo Kashiyama, Kanagawa, Japan

[73] Assignee: Canon Kabushiki Kaisha, Tokyo, Japan

[21] Appl. No.: 595,667

[22] Filed: Oct. 11, 1990

Related U.S. Application Data

[63] Continuation of Ser. No. 256,473, Oct. 12, 1988, abandoned.

[30] Foreign Application Priority Data

Oct. 20, 1987 [JP] Japan .................................. 62-265706

[51] Int. Cl.⁵ .......................................... H01L 41/08
[52] U.S. Cl. ..................................... 318/116; 310/316
[58] Field of Search ............... 310/316, 317, 323, 328; 318/116

[56] References Cited

U.S. PATENT DOCUMENTS

| | | | |
|---|---|---|---|
| 3,152,295 | 10/1964 | Schebler | 310/316 X |
| 3,441,875 | 4/1969 | Shoh | 310/316 X |
| 3,443,130 | 5/1969 | Shoh | 310/316 |
| 4,484,099 | 11/1984 | Kawai et al. | 310/317 |
| 4,491,401 | 1/1985 | Inaba et al. | 354/271.1 |
| 4,495,432 | 1/1985 | Katsuma et al. | 310/328 |
| 4,504,760 | 3/1985 | Yamamoto et al. | 310/323 |
| 4,510,411 | 4/1985 | Makamata et al. | 310/316 |
| 4,560,263 | 12/1985 | Katsuma et al. | 354/195.1 |
| 4,587,452 | 5/1986 | Okumura et al. | 310/328 |
| 4,634,915 | 1/1987 | Mukoujima et al. | 310/323 |
| 4,658,172 | 4/1987 | Isukawa | 310/316 |
| 4,660,933 | 4/1987 | Notagashira et al. | 350/255 |
| 4,692,672 | 9/1987 | Okuno | 318/116 |
| 4,705,980 | 11/1987 | Mishiro | 310/317 X |
| 4,713,571 | 12/1987 | Suzuki et al. | 310/316 |
| 4,727,276 | 2/1988 | Isukawa et al. | 310/316 |
| 4,743,788 | 5/1988 | Takagi et al. | 310/316 |
| 4,749,896 | 6/1988 | Suzuki et al. | 310/316 |
| 4,952,834 | 8/1990 | Okada | 310/316 |
| 4,954,741 | 9/1990 | Furutsu et al. | 310/316 |
| 4,965,481 | 10/1990 | Kashiyama | 310/316 |
| 5,021,700 | 6/1991 | Takahashi et al. | 310/316 |

Primary Examiner—Mark O. Budd
Attorney, Agent, or Firm—Fitzpatrick, Cella Harper & Scinto

[57] ABSTRACT

This invention concerns with a drive circuit for a vibratory-wave motor and, in particular, is to provide a motor drive circuit in which there is provided a voltage variable circuit for automatically varying the voltage applied to the motor to follow up the variation of the frequency of a driving high-frequency signal to the motor, whereby the voltage that affords an optimum drive efficiency in response to the frequency variation is applied to the motor.

14 Claims, 4 Drawing Sheets

DRIVE CIRCUIT FOR VIBRATORY-WAVE MOTOR

This application is a continuation of application Ser. No. 07/256,473 filed Oct. 12, 1988, now abandoned.

BACKGROUND OF THE INVENTION

1. Field of the Invention

This invention relates to a drive circuit for vibratory-wave motor.

2. Description of the Related Art

To control the number of revolutions of the vibratory-wave motor, either the drive frequency may be varied with the constant voltage applied to the vibratory-wave motor as shown in FIG. 4, or the voltage to be applied to the vibratory-wave motor may be varied, or these may be combined so that the voltage varies in a number of discrete values with continuous variation of the frequency.

However, the above-described revolution number changeover methods have a drawback that in a case where the number of revolutions is controlled in such a manner that, while maintaining the voltage applied to the vibratory-wave motor at a constant level (for example, 30V), the drive frequency is varied as shown in FIG. 4 (on a curve for 30V of FIG. 4), if as the frequency deviates from the resonance frequency $f_{30}$ for the drive voltage of 30V as shown by a curve with the parameter of 30V in FIG. 3, the number of revolution lowers, the current flowing to the vibratory-wave motor will increase, thereby deteriorating the drive efficiency of the motor.

Also, if as shown at 30V, 25V and 20V of FIG. 4, many voltage sources are selectively used in combination with the variation of the frequency for the controlling purpose, it becomes possible to control the speed with the use of such a combination of the voltage and frequency as to produce a relatively good efficiency.

For example, in the state of 30V, the frequency is made variable in a range "a" of FIG. 4 to control the number of revolutions in a range of $N_1$-$N_2$. In a range of $N_2$-$N_3$, the drive voltage is changed over to 25V. With 25V, the frequency is made variable only in a range "b" from a resonance frequency $f_{25}$. Further in a range $N_3$-$N_4$, the drive voltage is changed over to 20V. Under the condition of 20V, the frequency is made variable in a range "c" from a resonance frequency $f_{20}$. Hence, the rotation speed in a wide range can be realized by varying the frequency which does not very largely deviate from the resonance frequency. Thus, the drive efficiency can be prevented from deteriorating.

However, according to this method, the use of a great number of voltage sources gives rise to a problem.

SUMMARY OF THE INVENTION

One aspect of the application is to provide a drive circuit for a vibratory-wave motor which is provided with an output variable circuit operating with the drive frequency of the vibratory-wave motor in such a manner that the output voltage varies with variation of the drive frequency, wherein the drive frequency and the output voltage are automatically varied to such a combination state as to produce a good motor drive efficiency.

Another aspect of the application is to provide a drive circuit for a vibratory-wave motor in which a resonance element such as a capacitor constituting a resonance circuit is connected to the primary coil of a transformer so that by applying a high-frequency signal to the primary coil of that transformer, an output is generated in the secondary coil of the transformer, this output being made to drive the motor, whereby the frequency and output voltage of the secondary coil output are caused to automatically vary to a combination state of good efficiency in motor drive by varying the frequency of the high-frequency signal applied to the aforesaid primary coil, thus solving the above-described problems.

Other aspects of the invention will become apparent from the following description of an embodiment thereof by using the drawings.

DETAILED DESCRIPTION OF THE PREFERRED EMBODIMENT

Figure 1:
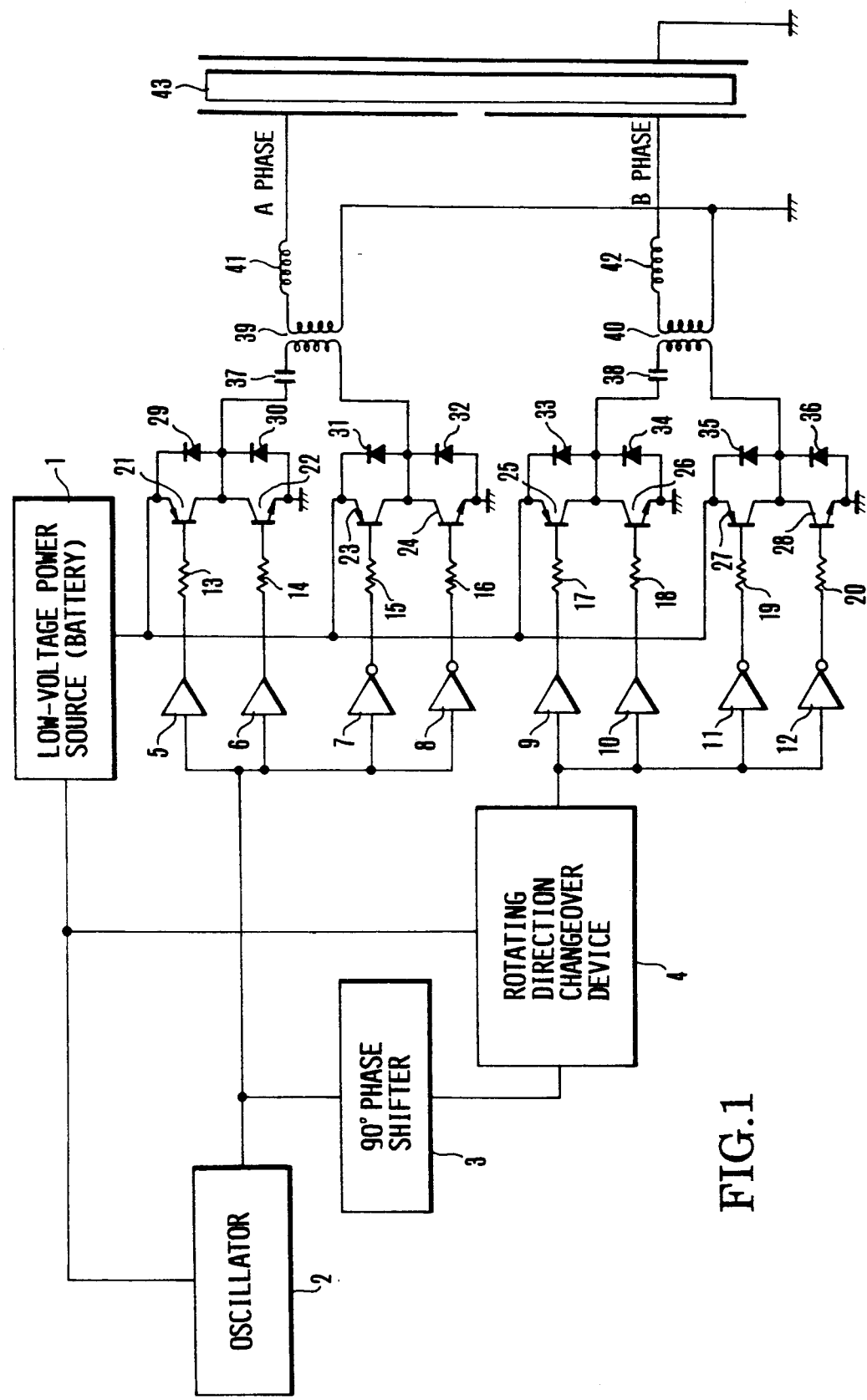
FIG. 1 is an electrical circuit diagram illustrating an embodiment of a drive circuit for vibratory-wave motor according to the present invention.

FIG. 1 shows one embodiment of the drive circuit for the vibratory-wave motor according to the present invention. In the same figure, 1 is a low-voltage power source (for example, battery); 2 is an oscillator for generating a high-frequency signal for driving a vibratory-wave motor 43, the oscillator 2 having variable means for manually varying the frequency of the output thereof; 3 is a phase shifter for 90° shifting the phase of the output of the oscillator 2 to form a high-frequency signal of 90° phase difference; 4 is a rotating direction changeover device for changing the phase of the high-frequency signal for driving to change the direction of rotation of the vibratory-wave motor 43, this changeover device 4 making the shifted high-frequency signal output from the phase shifter 3 to be either +90° or −90°, and operating in such a manner that when to rotate the motor 43 in the normal direction, it transmits the output of the phase shifter 3 as it is to buffers 9, 10 and inverters 11, 12 to be described later; 5, 6, 9 and 10 are non-inversion buffers for driving transistors 21, 22, 25 and 26 for switching to be described later; 7, 8, 11 and 12 are inversion buffers (inverters) for inverting the phase of the high-frequency signal for driving to drive transistors 23, 24, 27 and 28 for switching; 13–20 are base resistors of the transistors 21–28; 21–28 are transistors for switching; 29–36 are protection diodes for protecting the transistors 21–28 by absorbing the counter electromotive force of transformers 39 and 40; 37 and 38 are resonance capacitors for performing series resonance with the inductance of the primary coils of the transformers 39 and 40; 39 and 40 are transformers for boosting the high-frequency low voltage for driving to a voltage necessary to drive the vibratory-wave motor 43; 41 and 42 are waveform shaping coils for shaping the boosted high-frequency for driving into a sine wave; 43 is a vibratory-wave motor to be driven by a high-frequency high voltage.

Figure 6:
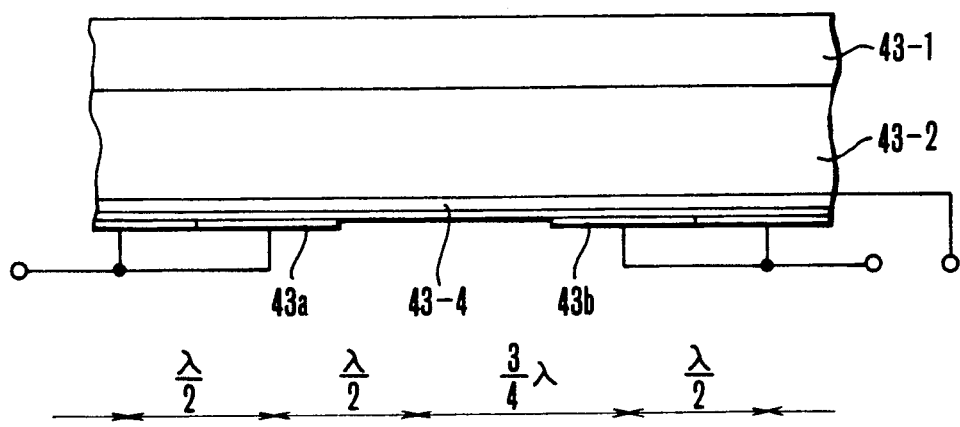
FIG. 6 is a sectional view illustrating the structure of the vibratory-wave motor.

FIG. 6 is a sectional view looked from the peripheral direction of the vibratory-wave motor 43. In this FIG. 6, 43-1 is a rotor; 43-2 is a vibrator; 43-4 is a polarized piezo-electric element or electrostrictive element (hereinafter referred to as an electro-mechanical energy conversion element) mounted on the vibrator 43-2; 43a and 43b are electrodes. The vibrator 43-2 and the electro-mechanical energy conversion element 43-4 constitute a stator. The rotor 43-1 is in frictional contact on the vibrator 43-2.

Of the above-described electrodes 43a and 43b, on the assumption that the inflexional progressive wave in the vibrator 43-2 has a wavelength $\lambda$, the electrodes 43a for driving are arranged on the conversion element 43-4 in spaced relation by $\lambda/2$. Also, the electrodes 43b for driving too are arranged in spaces of $\lambda/2$ on the conversion element 43-4. The electrodes 43a and 43b are displaced from each other by a distance of $3\lambda/4$ in phase. By the conversion elements to which the driving voltage is applied by the electrodes 43a, a conversion element portion of A phase is constituted. By the conversion elements to which the driving voltage is applied by the electrodes 43b, a conversion element portion of B phase is constituted. The polarizing and the electrode arrangement and construction themselves for these conversion elements are known, so their detailed explanation is omitted here.

In the above-described structure, by applying high-frequency voltages of 90° different phase to the electrode 43a and the electrode 43b, a progressive vibratory wave generates on the vibrator 43-2, and the rotor 43-1 is driven by that vibratory wave.

Next, the operation of such arrangement is described. The high-frequency signal generated in the oscillator 2 is 90° shifted by the 90° phase shifter 3 to form a high-frequency signal for driving the vibratory-wave motor 43 of the same frequency with the phase difference of 90°. Then, in the rotating direction changeover device 4, the phase difference is 90° delayed or advanced to determine the direction of radiation of the vibratory-wave motor 43.

Figure 2:
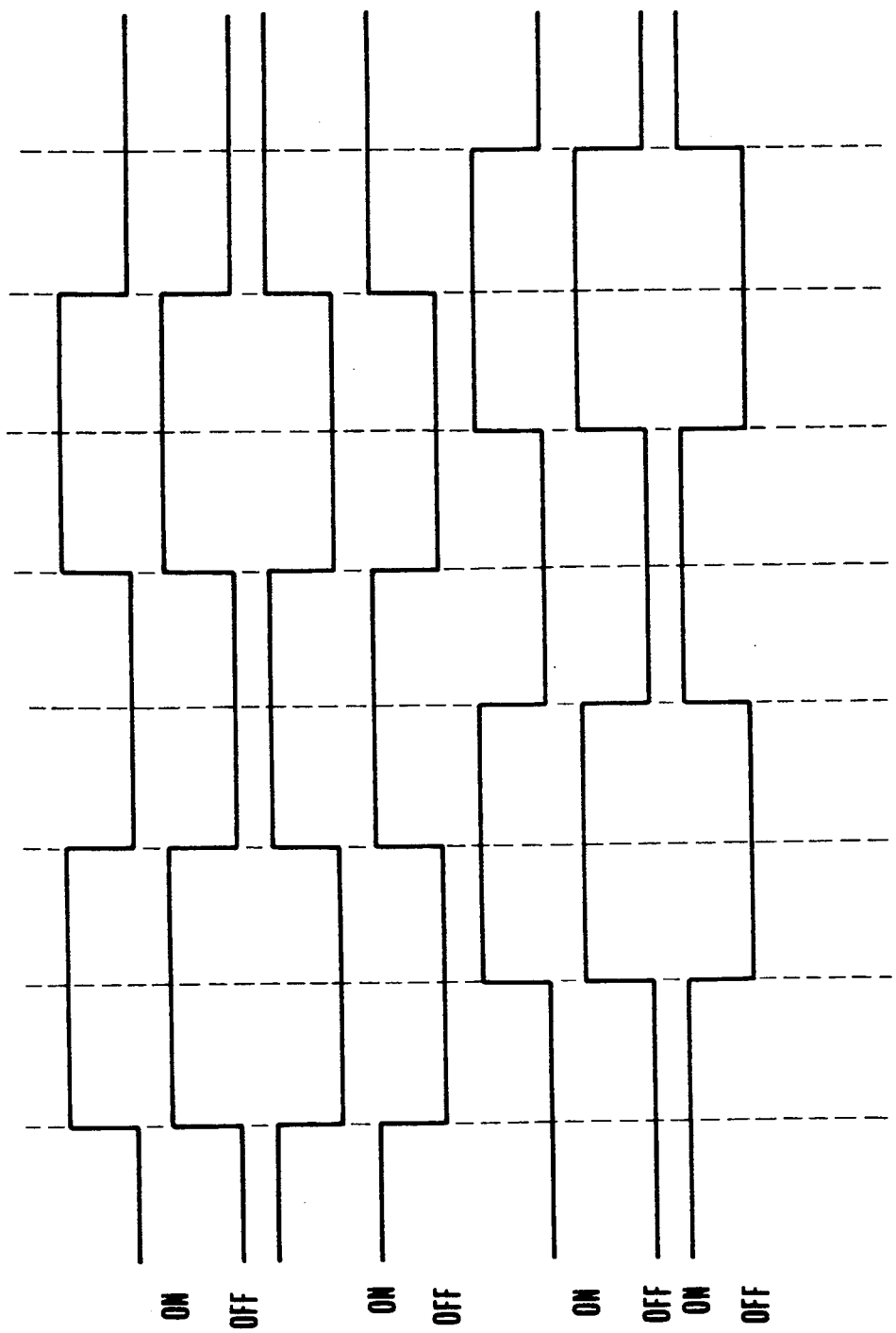
FIG. 2(a)–FIG. 2(g) are wave forms to explain the operation of the circuit of FIG. 1.

The signals for driving the vibratory-wave motor 43 formed in such a manner are passed respectively through the buffers 5-12 and supplied to the bases of the switching transistors 21-28, thus becoming signals for switching. Suppose the oscillator 2 is now producing output pulses shown in FIG. 2(a), the transistor 21 turns on and off as shown in FIG. 2(d), while the transistor 22 turns on and off as shown in FIG. 2(b). Also, the output of the oscillator 2 through the inverter 7 or 8 is shown in FIG. 2(c), so that the transistor 23 turns on and off as shown in FIG. 2(b), and the transistor 24 turns on and off as shown in FIG. 2(d). Therefore, at the primary coil of the transformer 39 the current flows to alternately different directions, causing a high-frequency high voltage to generate in the secondary coil of the transformer 39.

Meanwhile, at the output of the rotating direction changeover device 4, there appear pulses of FIG. 2(e) which are different in phase from the output of the oscillator 2 by 90°. For this reason, the transistors 26 and 27 turn on and off as shown in FIG. 2(f), and the transistors 25 and 28 turn on and off as shown in FIG. 2(g). Hence, current of alternately different direction flows even to the primary coil of the transformer 40. Thus, even at the output of the secondary coil of the transformer 40, a high-frequency high voltage is produced.

As described above, since the output pulses of the oscillator 2 and the rotating direction changeover device 4 differ in phase by 90°, it results that the outputs of the transformers 39 and 40 too differ in phase by 90°. After having been shaped to sine waves by the coils 41 and 42, the output pulses are then applied to the individual electrodes 43a and 43b. Thus, the conversion element portions of A phase and B phase have the high-frequency high voltages of 90° different phase applied thereto. As has been described above, the vibratory-wave motor 43 rotates.

The capacitor 37 or 38 for resonating is connected in series to the primary coil of the aforesaid transformer 39 or 40, constituting a series resonance circuit.

Figure 5:
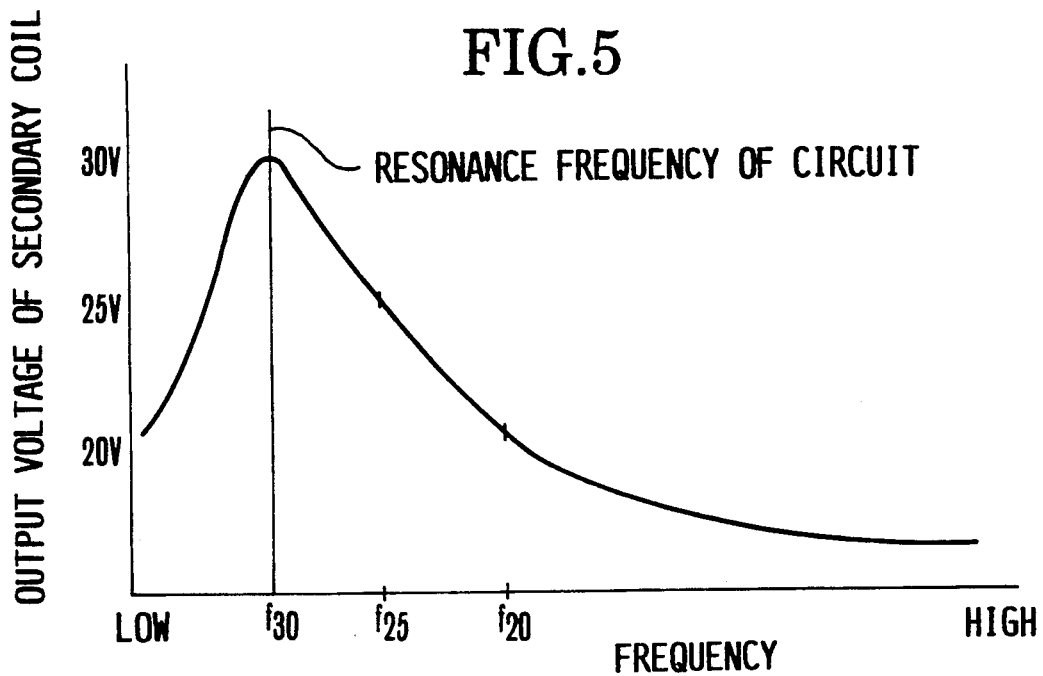
FIG. 5 is a graph to explain the characteristic of the transformer of the FIG. 1 embodiment.

This series resonance circuit operates in such a manner that at or near its resonance frequency the highest voltage is applied to the primary coil of the transformer, and as deviating from the resonance frequency, the voltage to be applied to the primary coil lowers. Hence the output voltage of the secondary coil of the transformer is highest at or near the resonance frequency of the primary side resonance circuit as shown in FIG. 5, and, as the deviation from the resonance frequency increases, the output voltage lowers.

Figure 3:
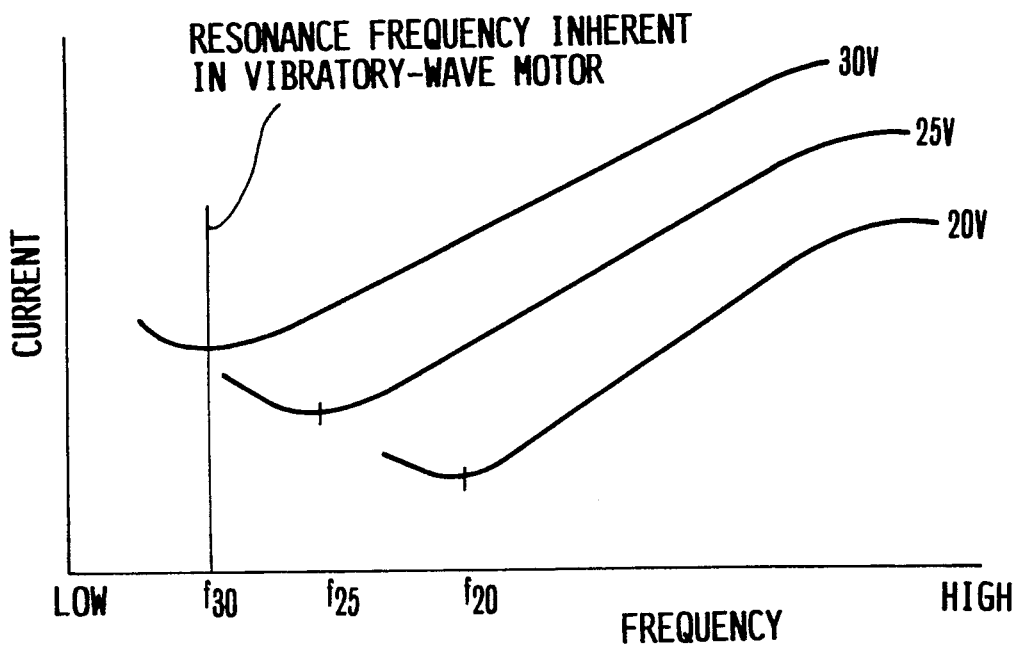
FIG. 3 and FIG. 4 are graphs to explain the drive characteristics of the vibratory-wave motor.
Figure 4:
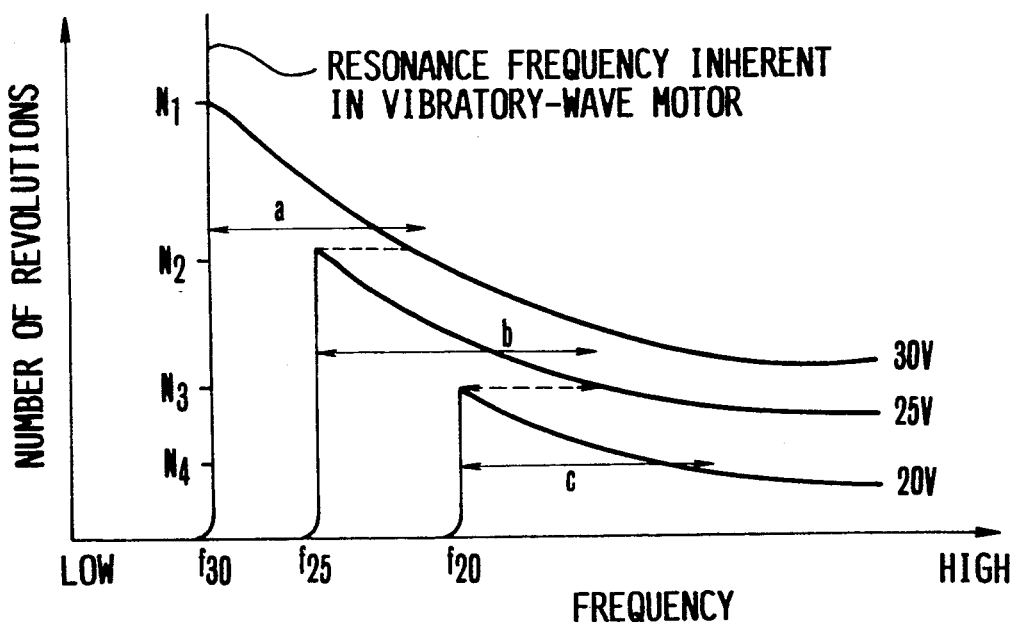

Here, the relation of frequency-current of the vibratory-wave motor is as shown in FIG. 3, and the relation of frequency-number of revolutions is as shown in FIG. 4. In a case where with the voltage maintained constant (for example, at 30V), the number of revolutions is varied by varying the frequency, the input current increases as the deviation from the resonance frequency increases, causing the drive efficiency of the motor to deteriorate. In order not to deteriorate the drive efficiency, therefore, the driving voltage must be made to vary along with the frequency so that the motor is driven always at a minimum point of the input current. If so, then it becomes possible to vary the number of revolutions without causing the drive efficiency of the motor to deteriorate.

Accordingly, in the present invention, the resonance frequency and the Q (quality factor) of the resonance circuit is so set that the resonance frequency used for resonance in the primary coil of the transformer is made coincident with the resonance frequency inherent in the vibratory-wave motor and that the frequency-output voltage characteristic at the time of deviation from the resonance point is made coincident with the frequency-voltage characteristic at such a point that the input current of the vibratory-wave motor becomes minimum. By this, when the frequency is varied, the voltage applied to the vibratory-wave motor varies so that the current is controlled always to a minimum. Thus, an improvement of the drive efficiency is achieved.

That is, now assuming that the oscillation frequency of the oscillator 2 is set to the resonance frequency $f_{30}$ of the aforesaid series resonance circuit, and at this time 30V generates as the secondary side output of the transformer 39 or 40, then because, as has been described above, the resonance frequency of the vibratory-wave motor coincides with the resonance frequency of the series resonance circuit, the motor operates at a high drive efficiency as shown by the line of 30V of FIG. 3. To lower the number of revolutions of the motor from this state, the output frequency of the oscillator 2 is altered, or shifted from $f_{30}$ to $f_{25}$. The secondary side output of the transformer then becomes 25V as shown in FIG. 5. Since, in this state, as shown in FIG. 3, the frequency $f_{25}$ coincides with the resonance frequency of the motor under 25V, the motor operates at the high drive frequency. Also, to further lower the number of revolutions, the output frequency of the oscillator 2 is altered from $f_{25}$ to $f_{20}$, the secondary side output of the transformer becomes 20V as shown in FIG. 5. Even in this state, the frequency $f_{20}$ coincides with the resonance frequency of the motor under 20V. Even in this state, the motor operates in the high drive efficiency state.

In such a manner, in the present invention, when controlling the speed of rotation of the motor, variation of the drive frequency automatically causes variation of the drive voltage also, whereby the relation of the drive voltage and drive frequency of the motor is controlled always so as to minimize the input current of the motor.

In the present invention, when the drive frequency is varied, the drive voltage varies automatically, and such a combination of the frequency and the drive voltage as to hold the condition that the motor is in the resonance state is always maintained. Therefore, it is possible to extremely improve the drive efficiency.

It should be noted that though in the embodiment the pulses for determining the drive frequency are obtained directly from the oscillator 2, a frequency divider circuit for dividing the frequency of the oscillator output may be used so that the drive frequency is determined by the output of this frequency dividing circuit. In this case, the arrangement becomes such that the drive frequency is made variable by selecting the frequency division stages. Also, though the piezo-electric device is used as the motor of this embodiment, the electrostrictive element may be used. Again, as the concrete element, PZT, etc. can be utilized. Also though in this embodiment the rotor is made to rotate, the rotor and the stator may be driven relative to each other.

What is claimed is:

1. A drive circuit for a vibration motor in which signals of different phase from each other are applied to an electro-mechanical energy conversion element portion arranged on a vibrator in a phase differing relation to form a vibration in the vibrator and by said vibration a driving force is obtained, comprising:
   (a) a frequency signal forming circuit for forming frequency signal, said forming circuit including changing means for changing the frequency of the frequency signal; and
   (b) an output voltage variable circuit including varying means for varying an output voltage level of the frequency signal in association with a change in frequency therein, said varying means varying the output voltage level continuously in association with a continuous change in frequency, an output of said output voltage variable circuit being applied to said conversion element portion whereby the speed of the vibration motor is changed.

2. A drive circuit according to claim 1, wherein said output voltage variable circuit forms a voltage of output level that satisfies a resonance-frequency versus applied-voltage characteristic line of said motor relative to the variation of frequency of said frequency signal.

3. A drive circuit according to claim 1, wherein said output voltage variable circuit reduces the output voltage level as the frequency of said frequency signal a higher frequency.

4. A drive circuit according to claim 1, wherein said electro-mechanical energy conversion element portion is an electrostrictive element portion.

5. A drive circuit according to claim 1, wherein said electro-mechanical energy conversion element portion is a piezo-electric element portion.

6. A drive circuit for a vibration motor in which signals of different phase from each other are applied to an electro-mechanical energy conversion element portion arranged on a vibrator in a phase differing relation to form a vibration in the vibrator and by said vibration a driving force is obtained, comprising:
   (a) a frequency signal forming circuit for forming a frequency signal, said forming circuit including changing means for changing the frequency of the frequency signal;
   (b) a transformer circuit operating in response to said frequency signal output from said frequency signal forming circuit, said transformer circuit producing an output whose frequency is the same as that of the frequency signal and whose voltage varies corresponding to a variation in frequency of said frequency signal whereby the output voltage varies continuously in correspondence with a continuous change in frequency; and
   (c) an applying circuit for applying the output of said transformer circuit to said electro-mechanical energy conversion element portion whereby the speed of the vibration motor is changed.

7. A drive circuit according to claim 6, wherein said transformer circuit is comprised of a transformer portion and a resonance circuit element constituting a resonance circuit relative to a primary coil of said transformer portion.

8. A drive circuit according to claim 7, wherein said resonance circuit element is a capacitor.

9. A drive circuit according to claim 6, wherein said electro-mechanical energy conversion element portion is an electrostrictive element portion.

10. A drive circuit according to claim 6, wherein said electro-mechanical energy conversion element portion is a piezo-electric element portion.

11. A vibration motor in which signals of different phase from each other are applied to an electro-mechanical energy conversion element portion arranged in a phase differing relation to form a vibration and by said vibration a driving force is obtained, or a device including said vibration motor, comprising:
   (a) a frequency signal forming circuit for forming a frequency signal, said forming circuit including changing means for changing the frequency of the frequency signal; and
   (b an output voltage variable circuit including varying means for varying an output voltage level of the frequency signal in association with a change in frequency therein, said varying means varying the output voltage level continuously in association with a continuous change in frequency, an output of said output voltage variable circuit being applied to said conversion element portion whereby the speed of the vibration motor is changed.

12. A vibration motor or device according to claim 11, wherein said output voltage variable circuit forms a voltage of output level that satisfies a resonance-frequency versus applied voltage characteristic line of said motor relative to the variation of frequency of said frequency signal.

13. A vibration motor or device according to claim 11, wherein said output voltage variable circuit reduces the output voltage level as the frequency of said frequency signal shifts toward a higher frequency.

14. A vibration motor in which signals of different phase from each other are applied to an electro-mechanical energy conversion element portion arranged in a phase differing relation to form a vibration and by said vibration a driving force is obtained, or a device including said vibration motor, comprising:

(a) a frequency signal forming circuit for forming a frequency signal, said forming circuit including changing means for changing the frequency of the frequency signal;

(b) a transformer circuit operating in response to said frequency signal output from said frequency signal forming circuit, said transformer circuit producing an output whose frequency is the same as that of the frequency signal and whose voltage varies corresponding to a variation in frequency of said frequency signal whereby the output voltage varies continuously in correspondence with a continuous change in frequency; and (c) an applying circuit for applying the output of said transformer circuit to said electro-mechanical energy conversion element portion whereby the speed of the vibration motor is changed.

* * * * *

UNITED STATES PATENT AND TRADEMARK OFFICE
CERTIFICATE OF CORRECTION

PATENT NO. : 5,140,231
DATED : August 18, 1992
INVENTOR(S) : Kashiyama

It is certified that error appears in the above-identified patent and that said Letters Patent is hereby corrected as shown below:

Title page, item [56] References Cited

"Makamata et al." should read
--Hakamata et al.--.

COLUMN 5

Line 64, "signal a" should read
--signal shifts toward a--.

Signed and Sealed this

First Day of March, 1994

Attest:

BRUCE LEHMAN

Attesting Officer  Commissioner of Patents and Trademarks